United States Patent [19]

Huszár et al.

[11] 4,116,897

[45] Sep. 26, 1978

[54] COMPOUNDED PLASTIC SYSTEM

[75] Inventors: Andor Huszár; Géza Székely; Istán Rusznak; Lajos Trézl; György Bertalan; Ilona Zaoui nee Serföző; Imre Molnar, all of Budapest, Hungary

[73] Assignee: Tiszai Vegy Kombinat, Leninvaros, Hungary

[21] Appl. No.: 728,762

[22] Filed: Oct. 1, 1976

Related U.S. Application Data

[63] Continuation-in-part of Ser. No. 522,357, Nov. 11, 1974, abandoned.

[51] Int. Cl.$^2$ .................................................. C08K 5/00
[52] U.S. Cl. ...................... 260/17.4 R; 260/17.4 CL; 260/17.4 ST; 260/28.5 A; 260/42.18; 260/42.21; 260/42.22; 260/42.24; 260/42.45; 260/42.46; 260/42.57
[58] Field of Search ............... 260/42.45, 42.46, 42.57, 260/17.4 R, 17.4 ST, 28.5 A, 42.18, 42.21, 42.24, 42.22, 17.4 CL

[56] References Cited

U.S. PATENT DOCUMENTS

| 2,777,008 | 1/1957 | Kern et al. | 260/42.57 |
| 3,767,444 | 10/1973 | Zeisberger | 260/42.57 |
| 3,865,779 | 2/1975 | Oya | 260/42.45 |

*Primary Examiner*—James H. Derrington

[57] ABSTRACT

A compounded plastic system containing 3 to 90% by weight of a crystalline polyolefine, 0.4 to 80% by weight of a non-crystalline polyolefine, 25 to 90% by weight of a pigment and/or filling agent, 0.5 to 10% by weight of surfactants, and optionally other polymers, wherein the system contains two surfactants of different HLB-values, the one surfactant having a HLB-value lower than 9 and the other surfactant having a HLB-value higher than 9, both surfactants being heat-resistant up to at least 160° C.

The compounded plastic system according to the invention retains the properties of the starting system even when admixed with widely varying amounts of filling agents, and even more, in certain respects it possesses improved characteristics.

2 Claims, No Drawings

COMPOUNDED PLASTIC SYSTEM

This is a continuation-in-part of application Ser. No. 522,357, filed Nov. 11, 1974, now abandoned.

This invention relates to a compounded plastic system containing 3 to 90% by weight of a crystalline polyolefine, 0.4 to 80% by weight of a non-crystalline polyolefine, 25 to 90% by weight of a pigment and/or filling agent, 0.5 to 10% by weight of surfactants, and optionally other polymers as well.

As known, inorganic filling agents of mineral origin are frequently added to thermoplastic substances such as polyolefines, partly to provide them with special properties required in certain fields of application, and partly for economic reasons. As filling agents, mainly kaoline, bentonite, precipitated chalk, as well as glass and asbestos fibres are used. The torsion modulus, Brinell hardness, torsion rigidity, slide-elastic modulus, specific gravity, compressive strength, weldability and resistance to warping of the polyolefine increases to a certain limiting value with the increase in the amount of the filling agent added; on the other hand, however, the tensile strength, flexural strength, elongation at rupture, and impact-flexural strength of said polyolefines decrease to a considerable extent. The decrease of the latter four strength values reveals a considerable brittling effect of the filling agents, which is due to the fact that the molten polymer does not moisten the particles of the filling agent, generally hydrophilic in nature. The decrease of the melt index with the increase of the amount of filling agent reveals the fact that the filling agent particles present in the molten polymers exert an adverse effect on its processability (Kunststoff-Rundschau 19, 245 /1972/; 101 Plastics Today 40, p. 7 1972/).

Several efforts were made to decrease the incompatibility between the polymeric melts and filling agents. Thus, for example, some clay minerals were rendered organophilic utilizing their cation-exchange properties, and these organophilic filling agents were admixed with the polyolefines (U.S. Pat. No. 3,084,117).

The dyeability of polyolefines with basic dyestuffs can be ensured by admixing the polyolefines with organophilic clay minerals (Modern Textiles 12, 22/1971/) or colloidal silicic acid (German Patent Specification No. 1,469,818). A disadvantage of this method is, however, that solely clay minerals can be used as filling agents, and the pre-treatment of these clay minerals causes considerable extra expenses. Owing to the differences in the specific gravities, further difficulties arise when filling agents, even after an organophilizing pre-treatment are to be admixed with the polymer melts in amounts higher than 5% by weight. In this instance the granular polymer should be homogenized with a part of the filling agent in a prior mixing operation, and the further amount of the filling agent (exceeding 5%) can be introduced into the polymer only after this mixing procedure.

A disadvantage of the systems containing filling agents is that the introduced filling agents affect the physical and mechanical properties of the end-product, and the introduceable amount of filling agents is rather limited.

It is also known that the cold-resisting properties and stress-corrosion of polyolefines can be improved by admixing them with polyisobutylene (Kunststoffe 62,610/1972/; U.S. Pat. No. 2,993,028). Apart from the high costs of polyisobutylene, this method has the drawback that the treatment disadvantageously affects the mechanical properties of the product.

The invention aims at the elaboration of a compound plastic system containing a crystalline polyolefine together with non-crystalline polyolefine, which retains the properties of the starting compounded polymer system even when admixed with widely varying amounts of filling agents, and possesses improved properties in certain respects.

The invention is based on the recognition that certain properties, primarily the dyeability, electric conductivity and castability of compounded plastic systems containing a crystalline polyolefine and a non-crystalline polyolefine can be improved even when adding a considerable amount of filling agent to the system, if the filling agent is admixed with the compounded plastic system in the presence of two surfactants (surface-active agents) having different HLB-values.

This recognition is very surprising since it is known that on the one hand the mechanical properties of crystalline polyolefines are impaired to a considerable extent when admixing them with filling agents, and on the other hand, owing to the strong plasticizing effect of the non-crystalline polyolefines, the crystalline character of the crystalline polyolefine decreases. Thus, when adding these two substances to the crystalline polyolefine, both its mechanical properties and its orientability decrease. Consequently, one might expect that the compounded plastic systems according to the invention would also have such impaired properties. On the contrary, the compounded polymer systems according to the invention are orientable like pure crystalline polyolefines and have properties like crystalline polyolefines; furthermore, the products can also be processed by methods applicable to amorphous polymers.

The invention is based further on the recognition that high amounts of filling agents of any crystal structure or morphological properties, respectively, and of any polarity can be introduced into the compounded system in the presence of two surfactants having different HLB-values.

Finally, the invention is based on the recognition that advantageous rheological melt properties can be attained during processing even with filler contents ranging up to 90% by weight when two surfactants having different HLB-values are used. This recognition is very surprising because it is known that the rheological properties of compounded plastic systems with a filler content exceeding 25% by weight are getting worse in such a degree that the system becomes unprocessable.

The compounded plastic system according to the invention has higher melt flow index and better mechanical properties than the known plastic systems. These favourable properties can be attained by the use of two surfactants having different HLB-values wherein the surfactant having a higher HLB-value enhances the wetting processes and thereby decreases the surface tension between the filler particles themselves introduced into the polymer system, whereas the surfactant having a lower HLB-value decreases the surface tension between the polymer particles and the filler particles. Such effects cannot be attained by the use of a single surfactant.

Accordingly, the invention relates to a compounded plastic system containing 3 to 90% by weight of a crystalline polyolefine, 0.4 to 80% by weight of a non-crystalline polyolefine, 25 to 90% by weight of a pigment and/or filling agent, 0.5 to 10% by weight of surfactants, and optionally other polymers as well. The improvement in the compounded plastic system according to the invention is that the system contains two surfactants of different HLB-values, the one surfactant having a HLB-value lower than 9 and the other surfactant having a HLB-value higher than 9, both surfactants being heat-resistant up to at least 160° C.

The compounded plastic system according to the invention can be prepared from 3 to 90% by weight of a crystalline polyolefine, 0.4 to 80% by weight of a non-crystalline polyolefine, 25 to 90% by weight of a pigment and/or filling agent and optionally other polymers as well, by admixing the respective components with each other in the presence of 0.5 to 10% by weight, preferably 1 to 4% by weight of two surfactants being heat-resistant up to at least 160° C and having different HLB-values.

The components are admixed with each other preferably at a temperature exceeding the melting range of the crystalline polyolefine, by adding a pigment and/or filling agent as well as the surfactants separately or in admixture with each other to the melt of the crystalline and non-crystalline polyolefines.

The process can be carried out in any of the usual equipments of the plastic industry. According to a preferred method, the starting substances are converted into master batch granulates, which can be diluted with polyolefines or other thermoplastic polymers to an extent required by the special field of utilization. From this substances, obtained after diluting the master batch granulates, casted, extruded, calendered, etc. products as well as fibres can be produced, which all are well dyeable. Thus, for example, when using kaoline and montmorillonite as additive, fibres dyeable with dispersion dyestuffs and basic dyestuffs, while when using starch, cellulose or polyvinyl alcohol additives, fibres dyeable with reactive and direct dyestuffs are obtained.

The properties of the compounds plastic systems according to the invention can be varied in accordance with the requirements of the different fields of utilization by varying the quantitative ratios of the respective components. Thus, for example, when increasing the amount of the filling agent up to 40% by weight the tensile strength can be increased; while when utilizing quartz flour is an amount of 36% by weight, optimum mechanical properties can be achieved. By using conductive carbon black in an amount of 40 to 60% by weight, the product can be rendered conductive. Casted products can be prepared even when adding 82% by weight of a ceramic dielectric powder consisting of aluminium oxide, barium carbonate and titanium dioxide to the molten polymer, and these casted products can be used without or after ignition.

A crystalline polyolefine primarily polyethylene or isotactic polypropylene, while as non-crystalline polyolefine preferably polyisobutylene having a molecular weight ranging from 10,000 to 1,500,000, atactic polypropylene having a molecular weight ranging from 5,000 to 1,500,000 and high-pressure polyethylene having a molecular weight ranging from 1,000 to 70,000 can be used.

The pigments usable in the products according to the invention comprise e.g. rutile titanium dioxide, zinc oxide, phthalocyanine blue, phthalocyanine green, and cadmium sulfide.

Of the filling agents admixable with the molten polymer system, e.g. kaoline, talc, bentonite, zinc oxide, aluminium oxide, ceramic dielectric powder, quartz flour, powdered aluminium, graphite powder, carbon black glass fibre, asbestos, cement powder, silicic acid, colloidal silicic acid, precipitated chalk, sawdust, and bitumen are mentioned.

Polymers such as polystyrene, polyamide, polyethylene glycol, styrene acrylonitrile copolymers, starch, polyvinyl alcohol, and cellulose can be used as polymeric additives.

Depending on the field and conditions of use, furthermore on the nature of the polyolefine and other polymers, as well as the pigments and filling agents applied, non-ionic, cationic and anionic surfactants can equally be used.

As non-ionic surfactants primarily alkylpolyglycol ether acetates, fatty-acid polyethyleneglycol esters, phenol-polyglycol ether, fatty alcohol polyglycol ethers, alkylphenol polyethers, as well as condensates of fatty acids with polyamines, and condensates of fatty acids with fatty alcohols containing at least three ethyleneoxide groups per molecule can be used.

As cationic surfactants e.g. cetylpyridinium salts, cetyltrimethyl ammonium bromide, dilauryldimethyl ammonium bromide, and stearyldimethylbenzyl ammonium chloride can be used.

Of the anionic surfactants usable according to the invention sodium dodecylbenzene sulfonate, $C_{8-22}$ alkyl aryl sulfonates, $C_{8-22}$ aliphatic ester sulfates, sodium $C_{8-22}$ alkyl sulfonates, sulfonated $C_{4-12}$ alkyl naphthyl ethers and sodium salts of sulfonated mineral oils are mentioned as examples.

The compounded plastic system according to the invention can be used in the most diverse fields. Thus, for example, they can be converted into castings for pumps and mixers, ventilator blades fuse blocks, pipes, assemblies for lighting systems, electric insulating an conducting materials, furniture elements, articles for telecommunication applicable at high frequencies, films, fibrillated films and yarns, etc., by the usual pressing, casting, pressure casting or extrusion operations.

The main advantages of the compounded plastic system according to the invention are as follows:

a. the elongation of rupture of the product does not decrease despite of the high filling agent content, even more, the tensile strength increases up to a filling agent content of about 40 to 50% by weight;

b. the product is orientable regardless to its filling agent content;

c. systems far more flexible than the starting crystalline polyolefines can be prepared;

d. a filling agent of any polarity can be used;

e. the processability, such as castability, of the compounded plastic system does not grow worse in comparison with that of the starting polyolefine; even in some cases an improvement of processability can be attained;

f. the dyeability of the polyolefine can be achieved;

g. the compatibilities of the polymers initially incompatible with polyolefines can be increased;

h. the products can be well utilized at temperatures far exceeding the highest in-use temperature of normal PVC even under constant loading;

j. the product is shock-proof and, in contradistinction to the very expensive shock-proof PVC and shock-proof polystyrene, retains its favourable mechanical properties for a practically unlimited period.

The invention is elucidated in detail by the aid of the following non-limiting Examples.

The term "HLB-value" as used in the Examples in connection with the surfactants gives the degree of ability for being dispersed in water wherein the HLB-value of a tenzide giving a clear solution with water is 13 and that of a surfactant which cannot be dispersed in water at all amounts to 1 (Griffin, V.C., Official Digest Federation Paint and Varnish Production Clubs, 28, 466/1956/). In recent years HLB-values exceeding 13 are used as well (see e.g. catalogues of Atlas Chemical Industries Inc., Wilmington, Delaware, U.S.A.).

EXAMPLE 1

A master batch was prepared from

11% by weight of crystalline polypropylene (melt index: 2.5, measured at 230° C under a loading of 2.16 kg.), 3% by weight of polyisobutylene (average molecular weight: $3 \times 10^4$), 9% by weight of polyisobutylene (average molecular weight: $1.5 \times 10^6$), 3% by weight of a condensate of fatty acids with polyamines (HLB-value = 1), 3% by weight of a surfactant based on an oxyethylated lauryl alcohol containing 3 ethylene oxide groups per molecule in average (HLB-value = 10), and 72% by weight of silicium dioxide (particle size: 0.3 to 100 μm.)

on a Banbury-type mixer with a mixing time of 11 min., under the following mixing parameters: rotation speed of the stirrer: 105 r.p.m.; forced draft pressure: 4.3 atm., tension: 5.5 atm. The rheological behaviour of the disperse compounded melt system in the mixer showed a significant tenzide-activity since, despite the high ratio of filling agent, the current uptake at stirring is initially only 2 A, this value increases to 4 A as a function of the stirring time, and finally decreases to 3 A at the end of the stirring. For polypropylene the current uptake at stirring, under identical stirring conditions, amounts to 7 A, 10 A, and 3 A, respectively. This approximately 70% decrease in the initial current uptake reveals the rheologically favourable surfactant action manifesting in the molten system.

The thus-obtained master batch was diluted with polypropylene in a ratio of 1:1, 1:2 and 1:3, respectively, in a Battenfeld-type casting machine at a temperature of 180° to 200° C, and casted and pressed articles were made from the diluted mixtures. The tensile strength of the product prepared from the mixture with a dilution ratio of 1:3 (i.e. containing 18% of silicium dioxide) was 253 kg./cm²., while that of the product prepared from the mixture with a dilution ratio of 1:1 (i.e. containing 36% by weight of filling agent) was 333 kg./cm²., and thus it exceeded the tensile strength of pure polypropylene (320 kg./cm²).

The mixtures diluted with polypropylene in the ratios as given above were orientable. The stretching was carried out on an Instron equipment at 140° C with a fixation length of 2.5 cm. and a deformation speed of 2 cm./min. One might expect that, owing to the presence of filling agent, the samples can be stretched only to a certain limit (about 20 to 30%). On the contrary, the yield point values, determined from the strength-elongation curves, decreased by 70 to 80% in comparison with that of the pure polypropylene, despite of the filling agent content: i.e. the yield point of the pure polypropylene was 160 kg./cm²., while that of the disperse compounded systems diluted as given above were 38, 26, and 30 kg./cm²., respectively, in the order of decreasing filling agent content.

The strength examinations of the samples prepared with a stretching ratio of 1:8 showed results similar in tendency to those of the non-oriented samples. For samples containing 36% by weight of silicium dioxide the bending work was 116 g.cm., and the elastic regeneration ability was 89%, while the same values for pure polypropylene were 102 g.cm. and 85%., respectively.

These results are in contrast with the known data of the literature, according to which the strength of polyolefines should decrease and their rigidity should increase with increasing amounts of the admixed filling agent.

The insulating resistance of the thus-obtained compounded disperse system containing 36% by weight of silicium dioxide, measured at 100, 200, and 1000 V., respectively, was identical with (i.e. $10^{13}$ ohm.cm.), while that of the disperse system containing 18% by weight of silicium dioxide was higher than (i.e. $>10^{13}$ ohm.cm.) that of polypropylene ($10^{13}$ ohm.cm.).

The dielectric loss factors (tg δ) measured at 1 MHz and 1 KHz, respectively, were always identical with those of the pure polypropylene (5 to $7 \times 10^{-4}$ at 1 MHz; 0 at 1 KHz). The dielectric constant of the mixture containing 18% by weight of silicium dioxide was the same (9) while that of the mixture containing 36% of silicium dioxide was higher (11.3) than that of the pure polypropylene (9.5). (The dielectric constants were measured at 1 KHz.) Consequently, these substances can be utilized with good results as insulators. As a comparison it should be mentioned that the insulating resistance of the commercial china insulator is $10^{12}$ ohm.cm., its loss factor is $10^{-2}$, while its dielectric constant is 6 to 7, measured under identical conditions.

EXAMPLE 2

A homogeneous mixture was prepared from 29.8% by weight of crystalline polypropylene, 38% by weight of polyisobutylene (average molecular weight: $1.5 \times 10^6$), 5% by weight of an oxyethylated laurylalcohol based surfactant containing in average three ethyleneoxide groups per molecule (HLB-value: 10), 1% by weight of sorbitane monooleate (HLB-value: 4.3) and 26.2% by weight of colloidal silicic acid (specific surface area: 175 m²./g., average particle size: 10 to 40 μm., bulk density: 40 g./l.) in a Banbury mixer at a temperature of 160 to 200° C., with a stirring time of 11 minutes, under the following mixing parameters: speed of stirrers: 100 r.p.m., forced draft pressure: 4.3 atm., tension: 5.5 atm. The current uptake of the system at stirring was 2.6 A, 4.7 A and 3.5 A, respectively, in comparison with the values of 7 A, 10 A and 3 A, respectively, measured for polypropylene under identical stirring conditions.

The obtained master batch was processed and examined as discussed in Example 1.

Similarly to the results reported in Example 1, strength properties essentially identical with those of polypropylene both in oriented and in non-oriented state were obtained for the substance with the highest filling agent, surfactant and polyisobutylene contents. The tensile strengths of the non-oriented and oriented polymer systems prepared with a 1:1 dilution of the master batch were 352 kg./cm². and 3895 kg./cm²., respectively (this latter value was obtained in the direction of stretching at a stretching ratio of 1:8). The corresponding values for pure polypropylene were 320 and 3840 kg./cm², respectively. In this case, too, the yield point values determinable from the strength elongation curves decreased to a great extent (by about 80%) in comparison with those of polypropylene for all the three dilutions.

The system obtained with a dilution rate of 1:1 is substantially more flexible and has essentially better flexible regeneration ability than pure polypropylene. The bending work decreased to 74 g.cm., in comparison with the value of 102 g.cm. measured for pure polypropylene, and the flexible regeneration ability was 98%, in comparison with the value of 85% measured for pure polypropylene.

In none of the cases were the electric insulating properties worse than those of pure polypropylene. For mixtures with a dilution rate of 1:1 or 1:3, respectively, the insulation resistance was the same, while for mixtures with a dilution rate of 1:2 this value was greater than that of pure polypropylene ($10^{13}$ ohm.cm., and $>1.3 \times 10^{13}$ ohm.cm., respectively). The dielectric loss factor (tg δ) was the same as for pure polypropylene (5 to 6 × $10^{-4}$ at 1 MHz, and 0 at 1 KHz). The dielectric constant was lower that that of pure polypropylene for all the three diluted systems.

The fibres prepared from the diluted systems by orientation fibre production were well dyeable with dispersion and basic dyestuffs.

EXAMPLE 3

A mixture consisting of 90 parts by weight of quartz flour, 10 parts by weight of crystalline polypropylene and 10 parts by weight of polyisobutylene (average molecular weight: $1.5 \times 10^5$) was stirred for 6 minutes in a Banbury-type mixer. The parameters of mixing were the same as indicated in Example 1. A compounded system could not be prepared from these substances; the individual components were immiscible with each other.

When adding 0.5 parts by weight of an alkylaryl sulfonate with a HLB-value of 2 and 1.0 parts by weight of polyoxyethylene lauryl ether with a HLB-value of 12.8 to the mixture the homogenization process started, the polypropylene melted, and the filling agent got dispersed in this melt. Thus a compounded system was formed from the four components. The current uptake at stirring amounted initially to 1.8 A, then increased to 2.7 A, and finally decreased again to 1.8 A.

This product, when ignited at 1500° C, yields a dielectric applicable at high frequencies.

EXAMPLE 4

A mixture consisting of 90 parts by weight of ceramic dielectric powder (5% by weight of BaCO₃, 83% by weight of talc and 12% by weight of clay; particle size: 0.3 to 300 μm.), 10 parts by weight of crystalline polypropylene and 10 parts by weight of polyisobutylene (average molecular weight: $1.5 \times 10^5$) was mixed in the way as described in Example 3 but the system could not be homogenized.

The dispersion process could be started with a mixture of 1.5 parts by weight of an alkyl-aryl sulfonate (anionic surfactant; HLB-value = 2) and 2 parts by weight of a fatty acid polyglycol ester (non-ionic surfactant; HLB-value = 9.5), and thus a compounded system was prepared.

The obtained product was well castable and extrudable.

EXAMPLE 5

A mixture consisting of 62.16% by weight of crystalline polypropylene, 32.16% by weight of kaoline (particle size: 0.3 to 300 μm.), 1.46% by weight of polyisobutylene (average molecular weight: $3 \times 10^4$), 1.46% by weight of polyisobutylene (average molecular weight: $1.5 \times 10^5$), 1.46% by weight of a fatty alcohol containing 3 ethyleneoxide groups per molecule (HLB-value: 10), and 1.46% by weight of a fatty acid-polyamine based non-ionic surfactant (HLB-value: 1) was homogenized in a Battenfeld-type casting machine at 180° to 200° C. Sheets were pressed from the obtained compounded system at an etage press at 170° C, with a pressure of 120 kg./cm². Samples of 25 mm. length and 4 mm. width were cut from these sheets, and the strength properties of these samples were examined both in oriented and in non-oriented states. Stretching was performed as described in Example 1. In non-oriented state the tensile strength was 348 kg./cm². and the elongation at rupture was 17.7%, while the respective values in oriented state were 2992 kg./cm². and 35.6%, respectively. The non-oriented polypropylene had a tensile strength of 320 kg./cm². and an elongation at rupture of 10%, while the respective values of the oriented polypropylene were 3840 kg./cm². and 12.5%, respectively.

EXAMPLE 6

A mixture consisting of 51% by weight of crystalline polypropylene (molecular weight: 5000), 12.5% by weight of high-pressure polyethylene, 0.5% by weight of laurylalcohol containing 3 ethyleneoxide groups per molecule (HLB-value: 10), 2% by weight of polyoxyethylene stearyl ether (HLB-value: 4.9), and 34% by weight of silicium dioxide (particle size: 0.3 to 300 μm.) was homogenized as described in Example 1. The tensile strength of the obtained system was higher than that of polypropylene, while the elongation at rupture increased to a great extent (from 11% to 40%).

EXAMPLE 7

A mixture consisting of 4% by weight of crystalline polypropylene, 11% by weight of polyisobutylene (average molecular weight: $15 \times 10^5$), 3% by weight of polyisobutylene (average molecular weight: $1.5 \times 10^6$), 0.5% by weight of laurylalcohol containing 3 ethyleneoxide groups per molecule (HLB-value: 10), 0.5% by weight of a condensate of fatty acids with polyamines (HLB-value: 2) and 81% by weight of a ceramic dielectric powder (5% by weight of barium carbonate, 83% by weight of talc and 12% by weight of clay) was homogenized as described in Example 1. The current uptake at stirring was 1 A, 2 A and 2 A, respectively, as a function of the time of stirring.

A well castable and extrusable compounded system was obtained.

EXAMPLE 8

A master batch was prepared from 13% by weight of atactic polypropylene (molecular weight: 20,000), 41% by weight of crystalline polypropylene, 43% by weight of ignited china talc, 1% by weight of nonylphenol polyglycolether (non-ionic surfactant; HLB-value: 13.3) and 2% by weight of high-molecular weight fatty amines (Atlas G-3570; Atlas Chemical Industries, Wilmington, U.S.A; HLB-value: 4.5) as described in Example 1. The obtained master batch was diluted with polypropylene in a ratio of 1:1 as described in Example 1, and casted and pressed articles were prepared from the diluted mixture. The tensile strength of the obtained products was 387 kg./cm$^2$., their elongation at rupture was 81.6%.

EXAMPLE 9

A master batch was prepared from 48.5% by weight of crystalline polybutene-1, 14% by weight of polyisobutylene (average molecular weight: $3 \times 10^4$), 36% by weight of ignited china talc, 1% by weight of ammonium butylnaphthalene sulfonate (anionic surfactant; HLB-value: 13) and 0.5% by weight of sorbitane tristearate (HLB-value: 2.1) as described in Example 1, but at a mixing temperature of 140° C. The obtained master batch was diluted with polypropylene in a ratio of 1:1, as described in Example 1. Casted and pressed articles were produced from the diluted mixture. The tensile strength of the obtained products was 370 kg./cm$^2$., their elongation at rupture was 49%.

EXAMPLE 10

A compounded plastic system was prepared from 36% by weight of crystalline polypropylene, 8% by weight of polyisobutylene (average molecular weight: $3 \times 10^3$), 4% by weight of polyisobutylene (average molecular weight: $1.5 \times 10^4$), 5% by weight of polyisobutylene (average molecular weight: $1.5 \times 10^6$), 27% by weight of china talc, 15% by weight of polyamide (a copolymerization product of caprolactam and lauryllactam, melting in a range of 130°–140° C), and 1% by weight of a cationic surfactant (formate salt of triethanolamine esterified with a $C_{16}$ fatty acid; HLB-value: 14.6) and 4% by weight of sorbitane monopalmitate (HLB-value: 6.7) as described in Example 1. Fibrillated fibres were produced from this system under the following parameters: extrusion temperature: 180, 210 and 220° C, respectively, stretching temperature: 100° C, stretching ratio: 1:10, speed of the fibrillating roll: 400 r.p.m. The bending work of the fibrillated fibre was 0.87 g.cm./1000 den., the angle of elastic regeneration was 76° in the 0th minute and 125° in the 15th minute, in comparison with the bending work of 1.38 g.cm./1000 den. and the angles of 42.7° and 89.3° measured for polypropylene. Thus, a far softer and more elastic fibre could be produced from the compounded plastic system according to the invention than from polypropylene.

EXAMPLE 11

A compounded plastic system was prepared from 43.2% by weight of crystalline polypropylene, 7.5% by weight of styrene-acrylonitrile copolymer, 12.3% by weight of polyisobutylene (average molecular weight: $3.8 \times 10^5$), 32% by weight of $\gamma$—$Fe_2O_3$ and 1% by weight of polyethyleneoxide sorbitane fatty acid ester (non-ionic surfactant; HLB-value: 15.0) and 4% by weight of polyoxyethylene cetyl ether (HLB-value: 5.3) as described in Example 6. The obtained mixture as processed as indicated in Example 6. The tensile strength of the obtained products was very high: 410 kg./cm$^2$., while their elongation at rupture was 48%.

EXAMPLE 12

A mixture consisting of 40% by weight of aluminium powder, 49% by weight of crystalline polypropylene (melt index: 9 g./10 min.), 9.5% by weight of polyisobutylene (average molecular weight: $1.5 \times 10^6$) and 1% by weight of sulfated laurylalcohol (anionic surfactant; HLB-value: 11.7) and 0.5% by weight of high-molecular weight fatty amines (HLB-value: 4.5; Atlas G-3570) was homogenized at a roller mill at 200° C with a mixing time of 10 min., and the obtained compounded plastic system was pressed into sheets within 3 min. at 200° C with a pressure of 100 kg./cm$^2$. The tensile strength of the obtained sheets was 290 kg./cm$^2$., their elongation at rupture was 37%. The insulating conductivity of the system measured at 1000 V was $10^3$ ohm.cm; the same value of pure polypropylene was $10^{13}$ ohm.cm. When only one of the above surfactants, namely the fatty amines, is used in the same system and in an amount of 1.5% by weight, the insulating resistance of the obtained compounded system is about $10^5$ ohm.cm. and the mechanical properties of the product are considerably worse: tensile strength = 255 kg./cm$^2$. Thus the electric conductivity of polypropylene improved in the compounded plastic system according to the invention.

EXAMPLE 13

A master batch was prepared from 35.3% by weight of crystalline polypropylene, 52% by weight of rutile titanium dioxide, 2% by weight of laurylpyridinium sulfate (cationic surfactant; HLB-value: 15.6), 1.5% by weight of a condensate of fatty acids with polyamines; HLB-value: 1) and 9.2% by weight of polyisobutylene (average molecular weight: $1.5 \times 10^4$) as described in Example 1. The obtained master batch was diluted with polypropylene in a ratio of 1:1 as described in Example 1, and casted and pressed articles were prepared from the diluted mixture. Products being 5% higher in strength as polypropylene and having an elongation at rupture of 40% were obtained; this values are very surprising considering the high filler content.

Iron oxide red or iron oxide yellow can also be used as pigment instead of rutile titanium dioxide in the above mixture. The strength characteristics of the products obtained with these iron oxide pigments were the same as those of the above.

EXAMPLE 14

A mixture consisting of 60% by weight of conductive carbon black having a particle size of 30 to 100 microns, 27% by weight of crystalline polypropylene, 10% by weight of polyisobutylene (average molecular weight: $1.5 \times 10^6$), 1% by weight of lauryl pyridinium sulfate (cationic surfactant; HLB-value: 15.6), and 2% by weight of alkyl aryl sulfonate (anionic surfactant; HLB-value: 2) was homogenized in a roller mill at 200° C for 10 minutes and the obtained compounded plastic system was pressed into sheets for 10 minutes at 200° C with a pressure of 100 kg./cm$^2$. The tensile strength of the obtained sheets was 150 kg./cm$^2$,. their elongation at rupture amounted to 22% and their melt flow index (M.F.I.) was 0.8. The conductivity of the system was very excellent proved by the insulating resistance ($\rho$) measured at 1000 V which amounted to $1.5 \times 10$ ohm.cm; the same value of pure (unfilled) polypropylene (M.F.I. = 2.5) was $10^{13}$ ohm.cm.

When only one of the above surfactants, namely the lauryl pyridinium sulfate, is used in the same system and in an amount of 3% by weight, the insulating resistance of the obtained compounded system is much higher (about $10^3$ ohm.cm.) and the mechanical properties of the product are considerably worse: melt flow index (M.F.I.) = 0.5; tensile strength = 120 kg./cm$^2$.

What we claim is:

1. In a compounded plastic system containing 3 to 90% by weight of a crystalline polyolefine, 0.4 to 80% by weight of a non-crystalline polyolefine, 25 to 90% by weight of a pigment and/or filling agent, 0.5 to 10% by weight of surfactants, and optionally other polymers, the improvement that the system contains two surfactants of different HLB-values, the one surfactant having a HLB-value lower than 9 and the other surfactant having a HLB-value higher than 9, both surfactants being heat-resistant up to at least 160° C.

2. A compounded plastic system as claimed in claim 1, in which the non-crystalline polyolefine is selected from the group consisting of polyisobutylene having a molecular weight ranging from 10,000 to 1,500,000, atactic polypropylene having a molecular weight ranging from 5,000 to 150,000 and high-pressure polyethylene having a molecular weight ranging from 1,000 to 70,000.

* * * * *